US011231888B2

United States Patent
Ghali et al.

(10) Patent No.: US 11,231,888 B2
(45) Date of Patent: Jan. 25, 2022

(54) REINSTATED PRINT OPERATIONS

(71) Applicant: Hewlett-Packard Development Company, L.P., Spring, TX (US)

(72) Inventors: Anusha Ghali, Bangalore (IN); Balaji Yalamarthi, Bangalore (IN); . Sharanabasappa, Bangalore (IN); Vasu Agrawal, Bangalore (IN); Shakti Amarendra, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,115

(22) PCT Filed: Nov. 1, 2018

(86) PCT No.: PCT/US2018/058741
§ 371 (c)(1),
(2) Date: Apr. 29, 2020

(87) PCT Pub. No.: WO2019/094252
PCT Pub. Date: May 16, 2019

(65) Prior Publication Data
US 2020/0257474 A1    Aug. 13, 2020

(30) Foreign Application Priority Data
Nov. 7, 2017    (IN) .......................... IN201741039698

(51) Int. Cl.
G06F 3/12       (2006.01)
G06F 21/60      (2013.01)
G06K 15/02      (2006.01)

(52) U.S. Cl.
CPC ............ *G06F 3/121* (2013.01); *G06F 3/1258* (2013.01); *G06F 3/1271* (2013.01)

(58) Field of Classification Search
None
See application file for complete search history.

(56) References Cited

U.S. PATENT DOCUMENTS

| | | | |
|---|---|---|---|
| 7,684,064 B2 * | 3/2010 | Kimura ................. | G06F 3/1238 358/1.14 |
| 7,773,241 B2 | 8/2010 | Akao et al. | |
| 9,052,860 B2 | 6/2015 | Yamahata et al. | |
| 9,083,834 B2 | 7/2015 | Toyamasaki et al. | |
| 9,141,315 B2 | 9/2015 | Kanemoto et al. | |

(Continued)

FOREIGN PATENT DOCUMENTS

JP        2003319107        * 11/2003    ............... H04N 1/00

OTHER PUBLICATIONS

Robo~Unresolved MKS tft 2.8 resume after power out, Mar. 20, 2017, http://community.robo3d.com/~6 pages.

*Primary Examiner* — Beniyam Menberu
(74) *Attorney, Agent, or Firm* — HP Inc. Patent Department

(57) ABSTRACT

Approaches for reinstating a print operation are described. In one example, a random-access code corresponding to print operation interrupted from completing, by a print intervention event, is obtained. Further, a reinstated print operation is generated based on the intervened print operation. Thereafter, the reinstated print operation is securely maintained, wherein the reinstated print operation is accessible upon providing the random-access code.

19 Claims, 5 Drawing Sheets

(56) References Cited

U.S. PATENT DOCUMENTS

| | | | |
|---|---|---|---|
| 9,621,628 B1* | 4/2017 | Benton | G06F 21/645 |
| 10,248,798 B1* | 4/2019 | Jayakumar | H04N 1/00326 |
| 2005/0100378 A1* | 5/2005 | Kimura | G06F 21/608 |
| | | | 400/76 |
| 2006/0055973 A1 | 3/2006 | Saikawa | |
| 2006/0112021 A1* | 5/2006 | Maki | G06Q 20/3674 |
| | | | 705/67 |
| 2006/0221407 A1* | 10/2006 | Uchida | H04N 1/00233 |
| | | | 358/448 |
| 2006/0268315 A1* | 11/2006 | Randt | G06F 3/1238 |
| | | | 358/1.15 |
| 2007/0291286 A1 | 12/2007 | Utsunomiya | |
| 2008/0037065 A1 | 2/2008 | Kawata | |
| 2008/0068640 A1* | 3/2008 | Todaka | H04N 1/00007 |
| | | | 358/1.14 |
| 2009/0033992 A1 | 2/2009 | Ogiwara et al. | |
| 2009/0262868 A1 | 10/2009 | Mohammed | |
| 2009/0316206 A1* | 12/2009 | Anezaki | G06F 3/1204 |
| | | | 358/1.15 |
| 2010/0225947 A1 | 9/2010 | Yoshida et al. | |
| 2010/0231963 A1 | 9/2010 | Oda | |
| 2012/0069374 A1* | 3/2012 | Sasakura | G06K 15/408 |
| | | | 358/1.13 |
| 2013/0258377 A1 | 10/2013 | Armstrong et al. | |
| 2014/0053252 A1* | 2/2014 | Kelsey | H04L 63/104 |
| | | | 726/6 |
| 2014/0368850 A1* | 12/2014 | Kodama | G06F 3/1222 |
| | | | 358/1.13 |
| 2017/0160996 A1* | 6/2017 | Ohba | G06F 3/1222 |
| 2020/0034093 A1* | 1/2020 | Barrett | G06F 3/1238 |

* cited by examiner

REINSTATED PRINT OPERATIONS

BACKGROUND

Generally, any print operation may be initiated by a user through a computing device or a computer terminal. As the print operation is being processed, a print system may print the desired content on a print media, which generally stored for use in the print system. In some cases, the print operation may get interrupted owing to certain circumstances, such as a print media outage. In such cases, the print operation may resume when the print media is replenished in the print system.

BRIEF DESCRIPTION OF THE DRAWINGS

The following detailed description references the drawings, wherein.

DETAILED DESCRIPTION

Figure 1:
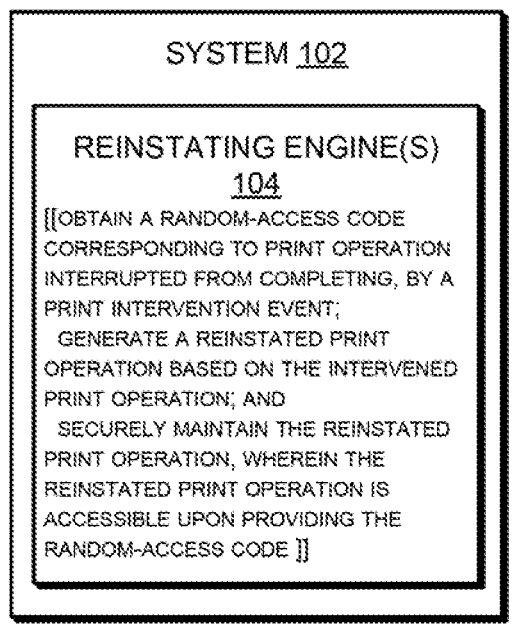
FIG. 1 is a diagram of an example system for reinstating a print operation.

Generally, any print operation may be initiated by a user through a computing device or a computer terminal. The print operation is typically carried out through a print system. In some cases, a print operation may be even initiated through the print system directly by simply uploading the digital file, for example by way of a removeable memory. Such a print system may be communicatively coupled, either through a wired medium or wirelessly, to the computing device. The print operation when initiated by the computing device may perform the printing process which results in the desired content to be printed onto one or more print media. The print content may be such that when rendered, it may span across plurality of print media. The printing process may continue till the entire content has been printed. A print operation may include any operation during which a print system under consideration is rendering content onto the print media, for example by way of a printing process. The mechanics of the printing process may differ between different types of print systems. For example, the printing process implemented by an ink-jet based print system differs from the printing process implemented by a laser-based print system.

One or more print intervention events may occur as the print operation is being processed. A print intervention event may be considered as any event which may intervene or interrupt the print operation and prevent it from completing. When a print intervention event occurs, the print operation may halt temporarily with no further content being printed onto the additional print media. Examples of such events include, but are not limited to, print media outage, ink outage, print media jams, power disruption, and so on. It is to be noted that the present list of print intervention event is only illustrative. Any other event which interrupts a print operation may be included within the scope of the present subject.

As would be understood, such events may be addressed or rectified by either the user, who had initiated the print operation, or by another individual. When a rectifying action is undertaken, the print operation may again resume from the point where the print intervention event had occurred. It may happen that when the print operation resumes, the remainder of the print medium carrying printed content is accessible to other individuals. Such individuals may not be authorized to access the information which has been printed. Therefore, there is, a possibility of private or privileged information being accessed by unauthorized individuals.

In some cases, print systems may allow resuming an intervened print operation by entering a predefined access code or a personal identification number (PIN). Examples of such a code include, but are not limited to, an employee code shared with a user at the commencement of employment or may include a user-defined code as well. The predefined access code or PIN may be input into the print system to resume the intervened print operation. Once the intervened print operation resumes, the printed media may be collected by the user. Such predefined codes or PINs may not be secure and may be prone to theft, snooping or may be determined through other mechanisms. For example, any bystander or passerby may note the access code being provided at the print system and later use the noted access code to access subsequent print operation initiated by the user.

Approaches for reinstating and securing an intervened print operation are described. As described previously, an intervened print operation may be considered as any print operation that did not complete owing to either the user intentionally interrupting the print operation by providing manually an overriding command, or owing to the occurrence of one or more events, such as print media outage, ink outage, and so on. Such instances (referred to as print intervention events), when occur interrupt the print operation. The print operations which are interrupted or intervened, say, because of the occurrence of the print intervention event, are secured by way of a print system generated random-access code. The random-access code is randomly generated. In one example, the random-access code is generated based on one or more attributes corresponding to the intervened print operation. Examples of such print related attributes include, but are not limited to, time at which the print operation was initiated, size of the file being printed, and so on. The random-access code forms the basis for securely reinstating one or more print operations which were interrupted owing to the occurrence of a print intervention event.

In operation, the print system may detect an occurrence of a print intervention event. Once the print intervention event is detected, the print system generates a random-access code. As described previously, the random-access code may be generated based on one or more attributes corresponding to the intervened print operation. In case multiple print operations have been interrupted, multiple, such random-access codes corresponding to the respective print operations are generated. The random-access code is then communicated to the user. The random-access code may be communicated either visually, for example, by briefly displaying the random-access code on a display panel coupled with the print system, or via email or any messaging service to the user.

In parallel, the corresponding print operation which was interrupted is further processed to generate a reinstated print operation. The reinstated print operation is such that it includes operative code, instructions or settings, which when processed by a print system carries out the remainder of the print operation which was interrupted by the print intervention event. In the present example, the reinstated print operation is stored and retained within a memory of the print system. While being retained, the reinstated print operation nor its details are listed, in any print queue of the print system. To access the reinstated print operation, the print system may further request the user to initially provide the random-access code. Once the random-access code is provided, the corresponding reinstated print operation is fetched from a memory within the print system memory, and presented to the user. In one example, the reinstated print operation is listed on the display panel coupled to the print system. The display panel may be either integrated or may be communicatively coupled with the print system.

As the reinstated print operation is fetched, it is listed and presented to the user. Once presented, the user may be further prompted for an additional authentication for performing the reinstated print operation. The additional authentication may be affected through, a predefined access code, PIN number or through any other authentication mechanism, without deviating from the scope of the present subject matter.

As would be noted, the present approaches allow for securing one or more intervened print operations from individuals who are otherwise not authorized to access such information. Such intervened print operations are protected from unauthorized access even if the predefined code of any user has been compromised. As per the present approaches, the intervened print operations may be securely retrieved and completed thereby maintaining the privacy and security of the information which is being printed.

These and other aspects are described in conjunction with various examples as illustrated in FIGS. 1-5. FIG. 1 illustrates an example system 102 to reinstate an intervened print operation. The print operations may have been interrupted or intervened owing to occurrence of a print intervention event. In the present example, the system 102 includes reinstating engine(s) 104. The system 102 may be implemented as a print device for printing digital content onto a print medium, such as a standalone or multifunction printers. In one other example, the system 102 may be implemented as processing resource based device communicatively coupled to other computing devices. The communication may be affected either through a wired or wireless medium, or may be implemented through a networked environment. The present description describes approaches for reinstate a print operation in print systems, such as the system 102. However, other possible example implementations, as noted above, would also be within the scope of the present subject matter.

In operation, the reinstating engine(s) 104 may detect the occurrence of one or more print intervention events. A print intervention event may be considered as any event which interrupts or intervenes an ongoing print operation. As described previously, during any print operation digital content is rendered on one or more print media as it is processed by a print device, such as the system 102. Such an operation may get interrupted due to print media outage, ink outage, by providing manually an overriding command by the user, or the like, wherein such occurrences are collectively referred to as print intervention event. In one example, the reinstating engine(s) 104 may detect the occurrence of one or more print intervention events. Once the print intervention event is detected, the reinstating engine(s) 104 generates a random-access code. In one example, the reinstating engine(s) 104 generates the random-access code based on attributes of the print operation which has been intervened. The random-access code once generated, is shared with the user. In one example, the random-access code may be displayed on a display panel (not shown in FIG. 1) coupled to the system 102 or on a display screen coupled to a computing device from which the print command was initiated.

Furthermore, the reinstating engine(s) 104 generates a reinstated print operation based on the intervened print operation. In one example, the reinstating engine(s) 104 may determine the extent of the print operation which was not completed, prior to the occurrence of the print intervention event. Once the reinstated print operation is generated, it is securely maintained within a memory location (not shown in FIG. 1) of the system 102. The reinstating engine(s) 104, to that end, may store the reinstated print operation in a manner such that it is neither accessible nor visible to any individual.

The reinstated print operation is accessible through the random-access code. To access the reinstated print operation, the user may input the random-access code shared with the user. On receiving the random-access code, the reinstating engine(s) 104 accesses the corresponding intervened print operations and presents it to the user. In another example, the user may be further prompted to input a predefined access code, such as a PIN or an employee code. The predefined access code is such that its unique for, and known to, the respective users. Once the predefined code is input, the reinstated print operation may be further processed and the printing may commence from the point at which the print intervention event had occurred. In one example, the predefined access code may also include a biometric input or an input provided through a smart card. It should be noted that any alternate mechanism for authentication may be performed without deviating from the scope of the present subject matter. As would be noted, the present approaches allow for securely maintaining the intervened print operation as reinstated print operation, and making such print operations only visible upon providing at least the random-access code and the predefined access code.

Figure 2:
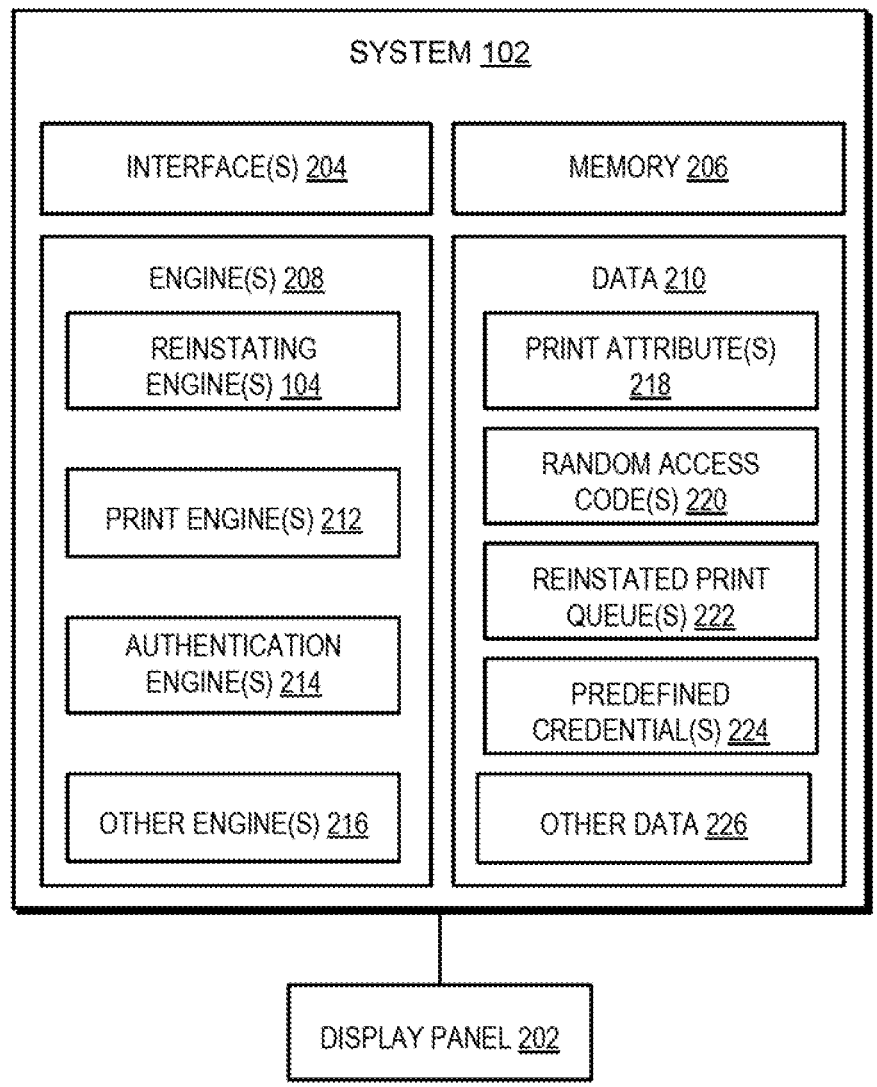
FIG. 2 is a block diagram of another example system for reinstating a print operation.

These and other functionalities are provided in further detail in conjunction with FIG. 2. FIG. 2 illustrates an example system 102 to reinstate a print operation which may have been interrupted because of a print intervention event. The system 102 may be implemented as a standalone print system which may be communicatively connected, through a network, to one or more computing devices. The system 102 may be either a standalone printer, or a multifunction device capable of printing content on print media. The system 102 may be further coupled to a display panel 202. Although the display panel 202 is depicted as coupled to the system 102, it may be integrated within the system 102 without deviating from the scope of the present subject matter.

Continuing with the present example, the system 102 includes interface(s) 204 and memory 206. The interface(s) 204 may include a variety of interfaces, for example, interfaces for data input and output devices, referred to as I/O devices, storage devices, network devices, and the like. The interface(s) 204 facilitate communication between the system 102 and various other computing devices connected in a networked environment or for example, with the display panel 202.

The memory 206 may store one or more computer-readable instructions, which may be fetched and executed, implement reinstating a print operation interrupted by a print intervention event. The memory 206 may include any non-transitory computer-readable medium including, for example, volatile memory such as RAM, or non-volatile memory such as EPROM, flash memory, and the like. The system 102 further includes engine(s) 208 and data 210.

The engine(s) 208 may be implemented as a combination of hardware and programming (for example, programmable instructions) to implement one or more functionalities of the engine(s) 208, In examples described herein, such combinations of hardware and programming may be implemented in several ways. For example, the programming for the engine(s) 208 may be processor executable instructions stored on a non-transitory machine-readable storage medium and the hardware for the engine(s) 208 may include a processing resource (for example, one or more processors), to execute such instructions. In one example, the programming may be implemented as firmware within the system 102. In the present examples, the machine-readable storage medium may store instructions that, when executed by the processing resource, implement engine(s) 208. In such examples, the system 102 may include the machine-readable storage medium storing the instructions and the processing resource to execute the instructions, or the machine-readable storage medium may be separate but accessible to system 102 and the processing resource. In other examples, engine(s) 208 may be implemented by electronic circuitry. The data 210 includes data that is either predefined or generated because of the functionalities implemented by any of the engine(s) 208. The data 210 may be stored in memory 208, or any other persistent storage either within the system 102 or coupled to the system 102.

In an example, the engine(s) 208 include reinstating engine(s) 104, print engine(s) 212, authentication engine(s) 214, and other engine(s) 216. The other engine(s) 216 may implement functionalities that supplement applications or functions performed by the system 102. Further, the data 210 may include print attribute(s) 218, random-access code(s) 220, reinstated print operation 222, authentication information 224 and other data 226.

The system 102 is to reinstate a print operation using the reinstating engine(s) 104. In one example, the reinstating engine(s) 104 may be implemented as firmware within the system 102. Besides reinstating a print operation interrupted by a print intervention event, the reinstating engine(s) 104 may further process one or more print commands for converting print stream data into one or more digital formats for printing. The reinstating engine(s) 104 may further retain an ongoing print operation in other data 226 till the print operation has completed successfully. The reinstating engine(s) 104 may further generate control instructions for the components of the system 102 to print the desired content. In one example, the control instructions from the reinstating engine(s) 104 may be processed by the printing print engine(s) 212 to affect the printing of content on the print media. The print engine(s) 212 may further determine whether any interruption in an ongoing print operation occurs.

In operation, the print engine(s) 212 may continuously monitor the print operation being carried out. For example, the print engine(s) 212 may count the number of pages that have been printed of the total number of pages that are to be printed as part of the print operation. It may happen that during printing, a print intervention event occurs. As discussed previously, the print intervention event may be considered as any event which interrupts or intervenes an ongoing print operation. On occurrence of a print intervention event, the system 102 may temporarily halt the printing of the desired content. Examples of print intervention event include, but are not limited to, print media outage, ink outage, a manual override command provided by a user. Other events which lead to interruption of the print operation would also be included within the scope of the present subject matter.

The occurrence of the print intervention event may be detected based on one or more indications generated by other components of the system 102. For example, a print media outage may be based on an indication generated by one or more sensors in the print media tray of the system 102. In another example, an empty cartridge may be detected by circuitry and/or sensors which may be present the print carriage assembly of the system 102. In a similar manner, other such indications, may be generated by the system 102, Such indications when generated result in the interruption of the print operation.

Returning to the present subject matter, such indications may be intercepted by the print engine(s) 212. The print engine(s) 212 on intercepting an indication may communicate the same to the reinstating engine(s) 104. In one example, the print engine(s) 212 may further determine one or more attributes corresponding to the intervened print operation. The attributes may be stored as print attribute(s) 218. Examples of such print attribute(s) 218 include, but are not limited to time stamp of the print operation under consideration, size of the file being printed, identity of the user, and so on. The list of print attribute(s) 218 is only illustrative and other examples may also be present without deviating from the scope of the present subject matter. Although the present description is provided in conjunction with a single intervened print operation, similar approach may be implemented for other intervened print operations as well.

Once the print attribute(s) 218 are obtained, the print engine(s) 212 may communicate the same to the reinstating engine(s) 104. The reinstating engine(s) 104 may further generate a random-access code(s) 220, based on the print attribute(s) 218. In one example, the reinstating engine(s) 104 utilizes a random function to generate the random-access code(s) 220. The print attribute(s) 218 may then be utilized as inputs to the random function to generate the random-access code(s) 220. As the print attribute(s) 218 corresponds to the intervened print operation, so would the random-access code(s) 220 as well.

Once generated, the reinstating engine(s) 104 communicates the random-access code(s) 220 to the user who had initiated the intervened print operation. The random-access code(s) 220 may be communicated through a variety of mechanism or protocols. For example, the reinstating engine(s) 104 may use simple messaging protocol to communicate the random-access code(s) 220 to the computing device of the user. If the user is in proximity of the system 102, the reinstating engine(s) 104 may further display the random-access code(s) 220 on the display panel 202 coupled to the system 102. In one example, the random-access code(s) 220 may be displayed for a brief time interval within which the user is provided with an opportunity to note the same.

Meanwhile, the reinstating engine(s) 104 determines the extent to which the intervened print operation had completed. For example, the reinstating engine(s) 104 determines the number of pages and the corresponding content that had been printed prior to the occurrence of the print intervention event. Such information may be provided, in one example, by the print engine(s) 212. As discussed previously, the print engine(s) 212 monitors the print operation as it is being carried out and tracks the extent to which the print operation has completed. Once the extent of the intervened print operation is determined, the reinstating engine(s) 104 may generate a reinstated print operation. In one example, the reinstating engine(s) 104 considers the number of pages remaining in the intervened print operation to generate the reinstated print operation. The reinstated print operation may be considered as a print operation for printing the content which did not get printed owing to the print intervention event. Once the reinstated print operation is generated, the intervened print operation may be deleted by the reinstating engine(s) 104.

Thereafter, the reinstating engine(s) 104 may store the reinstated print operation in reinstated print queue(s) 222. The reinstated print queue(s) 222 may be such, that it stores one or more reinstated print operations. The reinstated print queue(s) 222 may refer to a memory location within a memory coupled to the system 102. The reinstated print operations stored in the reinstated print queue(s) 222 are maintained in a hidden state and are not generally accessible or visible when any individual is attempting to observe the queue of the system 102. In one example, the reinstated print queue(s) 222 may be implemented as a locked folder which may be accessible only for select users. Each of the reinstated print operations within the reinstated print queue(s) 222 may be further mapped with the appropriate random-access code(s) 220 corresponding to the print operation which got interrupted owing to the print intervention event.

In the present example, the reinstated print queue(s) 222 is such that its constituents are made visible or presented to any user on providing the random-access code(s) 220. Once the random-access code(s) 220 is provided by the user, the reinstating engine(s) 104 may determine the corresponding reinstated print operation. It should be noted that only such reinstated print operation which correspond to the provided random-access code(s) 220 would be made visible to the user.

Once the reinstated print queue(s) 222 is made visible with the corresponding reinstated print operation, the user may further select the desired reinstated print operation for printing. On receiving the selection, the reinstating engine(s) 104 may further prompt the user to provide an additional authentication information to resume the print operation. The prompt for the additional authentication may be generated on the display panel 202 coupled to the system 102.

In one example, the additional authentication procedure may be implemented by the authentication engine(s) 214. The additional authentication information once received from the user is obtained by the authentication engine(s) 214. The authentication engine(s) 214 may further compare the received authentication information and compare it with one or more predefined credential(s) 224. Once a match is determined, the authentication engine(s) 214 may further communicate the same to the print engine(s) 212. The print engine(s) 212 on receiving the affirmation that the user has been authenticated may initiate the printing of the reinstated print operation. In such a case, the print engine(s) 212 may generate one or more control instructions for processing the reinstated print operation. The printing process once initiated, resumes from the point where the previous print operation had been interrupted by the print intervention event.

The additional authentication information may be either a predefined code, a PIN, or biometric information received from the user. In another example, the authentication information may be further received based on a smart card which is flashed onto a corresponding reader to affect the additional authentication. It should be noted that any other additional authentication information may also be utilized without deviating from the scope of the present subject matter. Furthermore, the additional authentication information may be such, that it is unique for each user. For example, an employee code or a prescribed printer code for accessing the system 102 control functions may also be used as additional authentication information.

As would be appreciated, the present approaches allow for securely maintaining one or more intervened print operations as reinstated print operations. Since the reinstated print operation are not even visible without providing a random-access code(s) 220, the possibility of any other user attempting to access the print operation on the system 102 is further reduced. Furthermore, the reinstated print operation may be initiated when the additional authentication information is provided, thereby further securing the print operation from unauthorized access.

Figure 3:
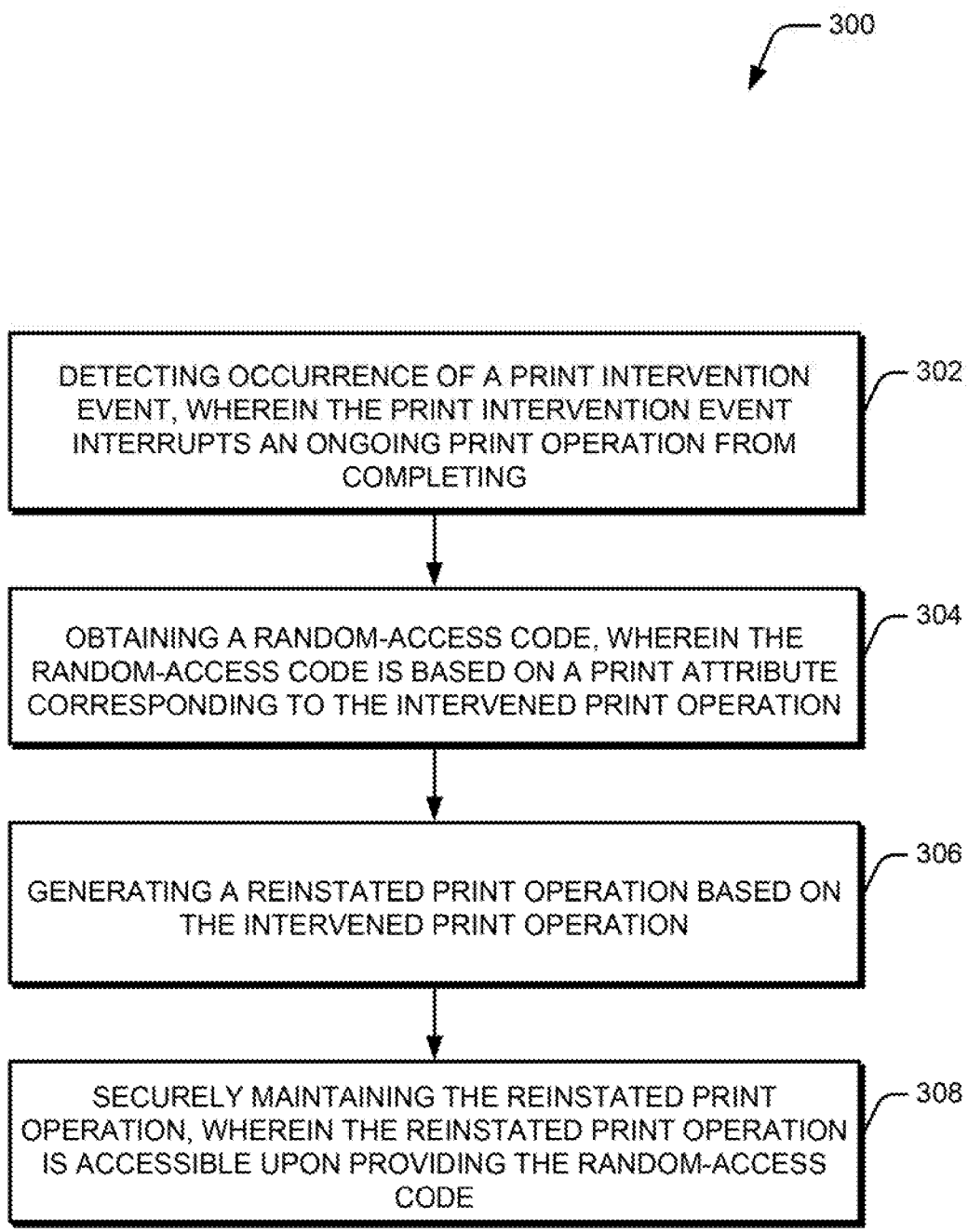
FIG. 3 depicts an example method for reinstating a print operation.
Figure 4:
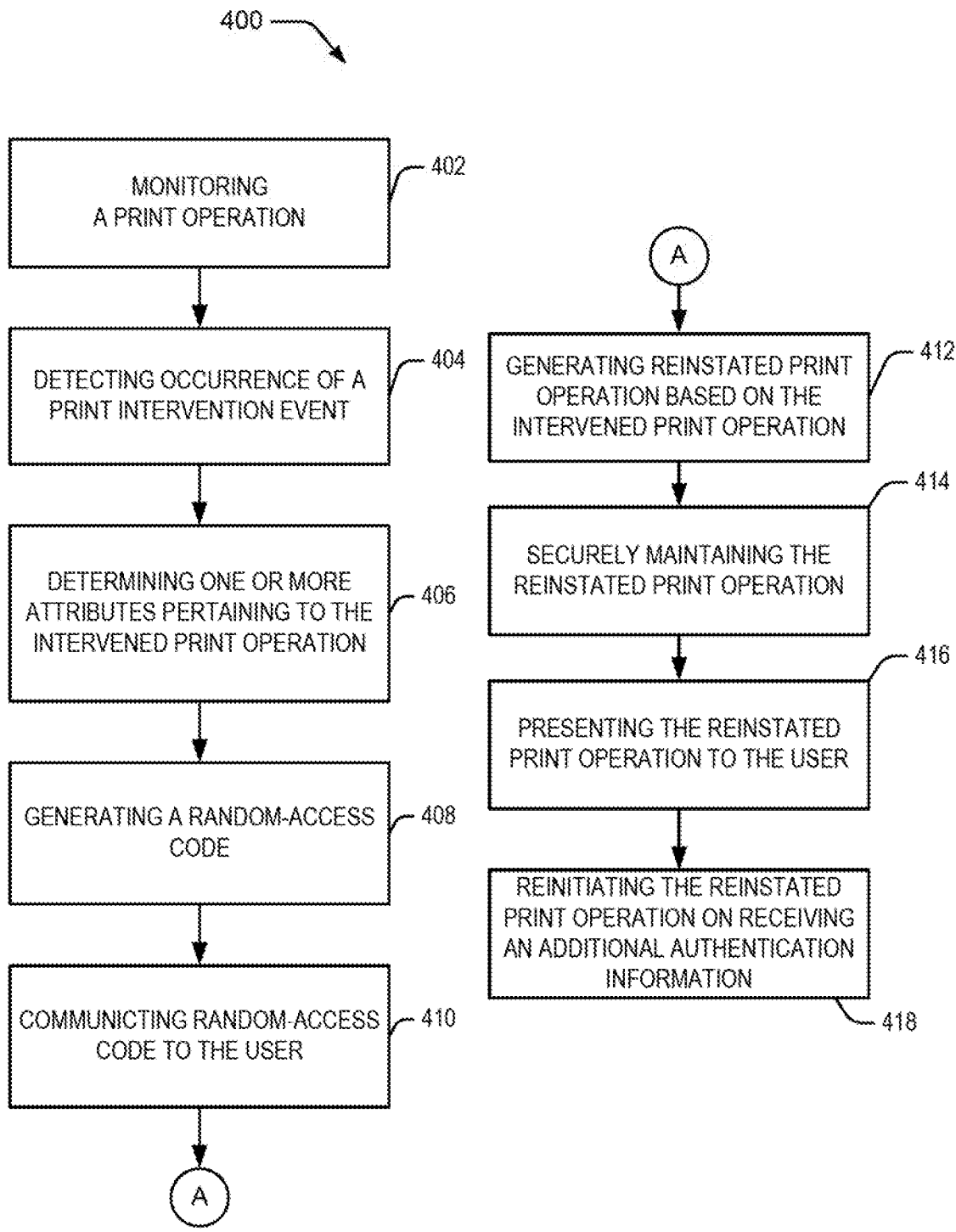
FIG. 4 depicts another example method for reinstating a print operation.

FIGS. 3-4 illustrate example methods 300 and 400, respectively, to reinstate a print operation, according to an implementation of the present subject matter. The order in which the methods are described is not intended to be construed as a limitation, and any number of the described method blocks may be combined in any order to implement the aforementioned methods, or an alternative method. Furthermore, methods 300 and 400 may be implemented by processing resource or computing device(s) through any suitable hardware, non-transitory machine-readable instructions, or combination thereof.

It may also be understood that methods 300 and 400 may be performed by programmed computing devices, such as system 102 as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to system 102 as described above: other suitable systems for the execution of these methods may also be utilized. Additionally, implementation of these methods is not limited to such examples.

Returning to FIG. 3, at block 302 occurrence of a print intervention event is detected. A print intervention event may be considered as any event which may intervene or interrupt the completion of the print operation. For example, the occurrence of one or more print intervention events may be determined based on one or more indications generated by the system 102. Such indications may be intercepted by the print engine(s) 212 of the system 102, and communicated to the reinstating engine(s) 104, In a further example, the reinstating engine(s) 104 may further determine one or more attributes of the corresponding intervened print operation. The attributes may be stored as print attribute(s) 218.

At block 304, a random-access code is obtained. For example, the reinstating engine(s) 104 generates a random-access code(s) 220, based on the print attribute(s) 218. In the present example, the reinstating engine(s) 104 utilizes a random function to generate the random-access code(s) 220. The random-access code(s) 220 may be unique to the intervened print operation.

At block 306, a reinstated print operation based on the intervened print operation is generated. For example, the reinstating engine(s) 104 determines the number of pages and the corresponding content that had been printed prior to the occurrence of the print intervention event. Once the extent of the intervened print operation is determined, the reinstating engine(s) 104 may generate a reinstated print operation, based on factors pertaining to the intervened print operation. Such factors include, but are not limited to, number of pages remaining in the intervened print operation.

At block 308, the reinstated print operation is securely maintained. For example, once generated, the reinstating engine(s) 104 stores the reinstated print operation in reinstated print queue(s) 222. While being stored, the reinstated print queue(s) 222 are maintained in a hidden state and are not generally accessible or visible, say when a queue corresponding to the system 102 is explored or accessed. The access to the reinstated print queue(s) 222 is based on the random-access code(s) 220. Only when a user provides a valid random-access code(s) 220, is the reinstated print queue(s) 222 made visible to the user.

FIG. 4 provides another example method 400 to reinstate a print operation, wherein the print operation under consideration has been interrupted or intervened by a print intervention event. At block 402, a print operation may be monitored. For example, the print engine(s) 212 may continuously monitor the print operation which is being processed. During monitoring, the print engine(s) 212 may determine the number of pages which have been printed with respect to the total number of pages which would eventually be printed once the print operation has completed. Once the print operation has completed, the print engine(s) 212 may communicate an indication of the same to reinstating engine(s) 104.

At block 404, occurrence of a print intervention event is detected. A print intervention event interrupts or intervenes the completion of an ongoing print operation. For example, the print engine(s) 212 may intercept one or more indications from components of the system 102 that the ongoing print operation has been intervened. In one example, the interruption may be detected based on one or more indications from sensors in the print tray assembly of the system 102 indicating print media outage. The print engine(s) 212 on detection of a print intervention event halts an ongoing print operation and may communicate the received indication to the reinstating engine(s) 104.

At block 406, one or more attributes pertaining to the intervened print operation are determined. For example, the print engine(s) 212 may further determine one or more attributes corresponding to the intervened print operation. The attributes may be stored as print attribute(s) 218. The print attribute(s) 218 may include attributes that are unique to the intervened print operation. Examples of such print attribute(s) 218 include, but are not limited to time stamp of the print operation under consideration, size of the file being printed, and identity of the user. The print attribute(s) 218 may be further shared with the reinstating engine(s) 104.

At block 408, a random-access code is generated. For example, the reinstating engine(s) 104 generates the random-access code(s) 220, based on the print attribute(s) 218. The reinstating engine(s) 104 may include logic implementing a random function. The print attribute(s) 218 when provided as arguments to the random function, or the reinstating engine(s) 104, generates the random-access code(s) 220. Considering that the print attribute(s) 218 may be unique for the intervened print operation, the random-access code(s) 220 thus generated would also be unique.

At block 410, the random-access code once generated is communicated to the user. The reinstating engine(s) 104 may use any communication protocol to communicate the random-access code(s) 220 to the computing device of the user. For example, the reinstating engine(s) 104 may communicate the random-access code(s) 220 through email, SMS, or a print-out bearing the random-access code(s) 220.

At block 412, a reinstated print operation is generated based on the extent to which the intervened print operation had completed. For example, the reinstated print operation may be generated by the reinstating engine(s) 104.

At block 414, the reinstated print operation is securely maintained. For example, the reinstating engine(s) 104 may store the reinstated print operation in reinstated print queue(s) 222. Within the reinstated print queue(s) 222, the reinstated print operations are maintained in a hidden state. The reinstated print queue(s) 222 is such that it is generally accessible or visible on providing the random-access code(s) 220. Each of the reinstated print operations may be further mapped with the appropriate random-access code(s) 220 corresponding to the print operation which got interrupted.

At block 416, the reinstated print operation is presented to the user. For example, the once the random-access code(s) 220 is provided by the user, the reinstating engine(s) 104 may fetch the corresponding reinstated print operation and present the same to the user. The reinstated print operation may be presented on the display panel 202 of the system 102.

At block 418, the reinstated print operation is further initiated on receiving an additional authentication information. For example, once the reinstated print queue(s) 222 is made visible with the corresponding reinstated print operation, the user may further select the desired reinstated print operation for printing. On receiving the selection, the reinstating engine(s) 104 may further prompt the user to provide an additional authentication information to resume the print operation. The additional authentication information once received from the user is obtained by the authentication engine(s) 214. The authentication engine(s) 214 on authenticating the user based on comparing the received authentication information with one or more predefined credential(s) 224 may communicate the same to the print engine(s) 212. Thereafter, the print engine(s) 212 may process the reinstated print operation to resume the print operation.

Figure 5:
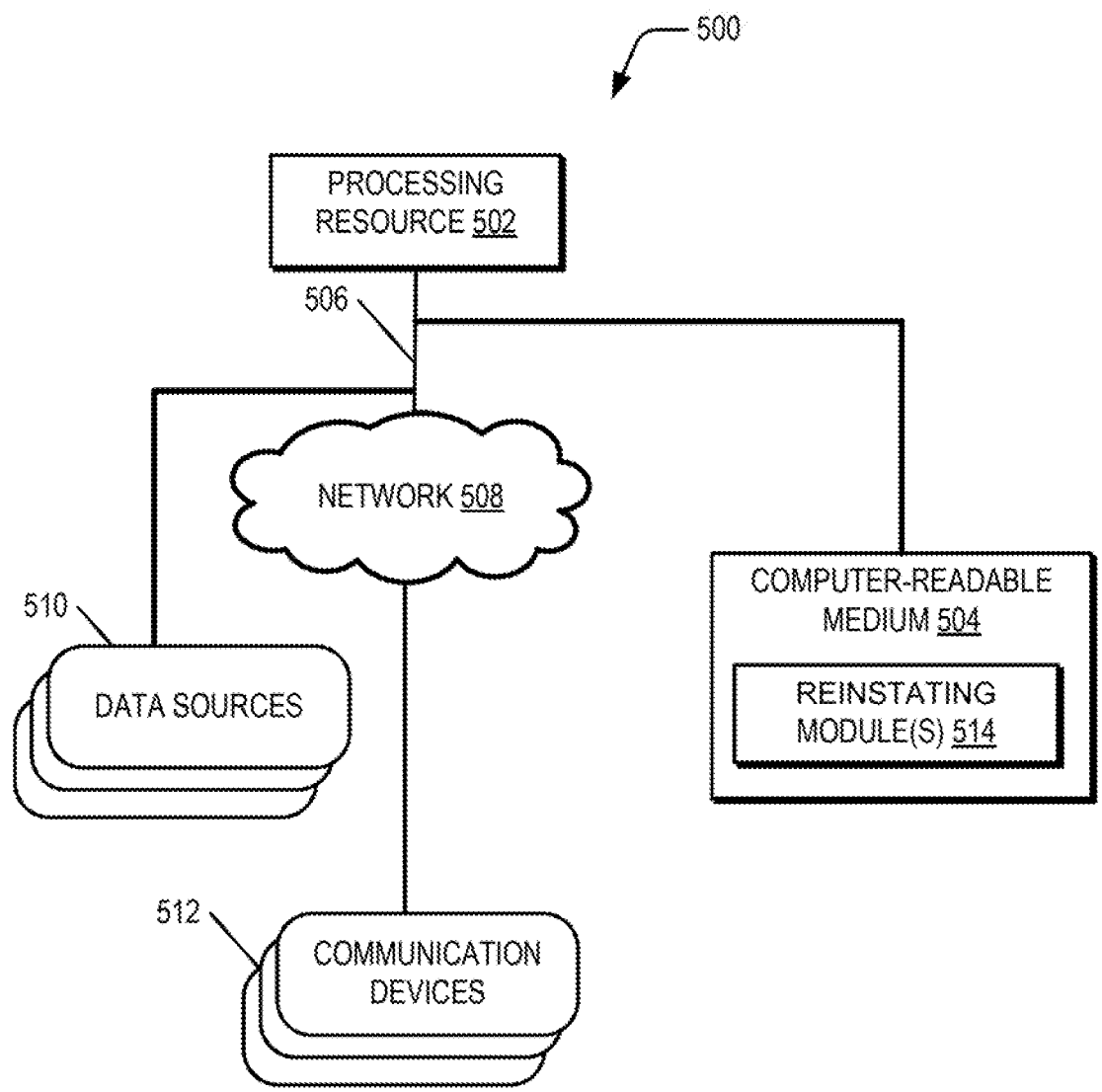
FIG. 5 is a block diagram of an example system implementing a non-transitory computer-readable medium, for reinstating a print operation.

FIG. 5 illustrates a system environment 500 to reinstate a print operation, according to an example of the present disclosure. The system environment 500 may comprise at least a portion of a public networking environment or a private networking environment, or a combination thereof. In one implementation, the system environment 500 includes a processing resource 502 communicatively coupled to a computer readable medium 504 through a communication link 506.

For example, the processing resource 502 can include one or more processors of a computing device to process a machine-readable link. The computer readable medium 504 may be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the computer readable medium 504 through a network 508. The network 508 may be a single network or a combination of multiple networks and may use a variety of different communication protocols.

The processing resource 502 and the computer readable medium 504 may also be coupled to data sources 510 through the communication link 506, and/or to communication devices 512 over the network 508. The coupling with the data sources 510 enables in receiving the data in an offline environment, and the coupling with the communication devices 512 enables in receiving the data in an online environment.

In one implementation, the computer readable medium 504 includes a set of computer readable instructions, implementing a scanning module(s) 514 and an alert generation module(s) 516. The instructions implementing reinitiating module(s) 514 may, in one example, be executable code for reinstate a print operation. The set of computer readable instructions within medium 504 may be accessed by the processing resource 502 through the communication link 506 and subsequently executed to process data communicated with the data sources 510 to reinstate a print operation.

In operation, the reinitiating module(s) 514 detects occurrence of one or more print intervention event which result in the interruption of an ongoing print operation, and accordingly reinstates the interrupted or intervened print operation. To this end, the reinitiating module(s) 514 may initially determine one or more attributes of the intervened print operation. The print attributes may be one or more characteristic information corresponding to the intervened print operation. In one example, the print attributes may be stored as print attribute(s) 218 and may include time stamp of the print operation under consideration, size of the file being printed, and identity of the user.

Once the print attribute(s) 218 are determined, the reinitiating module(s) 514 may further utilize the print attribute(s) 218 to generate random-access code(s) 220. In one example, the reinitiating module(s) 514 may include coding implementing a random function generator. In such a case, the reinitiating module(s) 514 may receive the print attribute(s) 218 as arguments to generate the random-access code(s) 220. As the print attribute(s) 218 corresponds to the intervened print operation, so would the random-access code(s) 220 as well.

In addition, the reinitiating module(s) 514 may further generate a reinstated print operation based on the intervened print operation. In one example, the reinitiating module(s) 514 may process the intervened print operation to convert it to the reinstated print operation. The reinstated print operation is such that it includes operative code, instructions or settings, which when processed by a print system carries out the remainder of the print operation which was interrupted by the print intervention event. Once the reinstated print operation is generated, it may be stored as reinstated print queue(s) 222. The reinitiating module(s) 514 may further securely maintain the reinstated print operation in the reinstated print queue(s) 222. To this end, the reinitiating module(s) 514 may not list the reinstated print queue(s) 222 for viewing when a print system, such as the system 102, is accessed. In another example, the reinitiating module(s) 514 may further render the reinstated print queue(s) 222 as inaccessible.

The access to the reinstated print queue(s) 222 may be obtained based on the random-access code(s) 220. Only when a user provides a valid random-access code(s) 220, is the reinstated print queue(s) 222 made visible to the user. In one example, the reinitiating module(s) 514 may generate a prompt requesting the user to enter the appropriate random-access code(s) 220. On receiving the random-access code(s) 220, the reinitiating module(s) 514 may determine the appropriate reinstated print operation and present the same to the user. The reinstated print operation may be presented to the user on the display panel. The reinstated print operation may be selected by the user In one example, the reinitiating module(s) 514 may implement a further authentication for initiating printing as per the reinstated print operation. Once the desired reinstated print operation is selected, the reinitiating module(s) 514 may generate a further prompt for additional authentication information from the user. The authentication information provided by the user may be in the form of a PIN, a predefined code, or biometric information. In one example, the user may also provide the additional authentication information through a smart card. Once the additional authentication information is received, the reinitiating module(s) 514 may generate control instruction for the system 102 to initiate the reinstated print operation.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A system comprising:
   a reinstating engine to:
   obtain a random-access code corresponding to a print operation interrupted from completing, by a print intervention event;
   generate a reinstated print operation based on the intervened print operation;
   store the reinstated print operation in a reinstated print queue in a hidden state and is not accessible nor visible; and
   securely maintain the reinstated print operation as data that is not visible in a specified memory location, wherein the reinstated print operation is accessible upon providing the random-access code.

2. The system as claimed in claim 1, wherein the random-access code is generated based on a print attribute corresponding to the intervened print operation.

3. The system as claimed in claim 2, wherein the print attribute comprises time at which the print operation was initiated, name of file being printed, and size of the file being printed.

4. The system as claimed in claim 2, wherein the random-access code is obtained based on a random function using the print attribute as input.

5. The system of claim 2, wherein the print attribute includes a timestamp.

6. The system as claimed in claim 1, wherein the print intervention event is one of manual override command to interrupt the ongoing print operation, print media outage, print media jam, power disruption, print ink outage, and print toner outage.

7. The system as claimed in claim 1, wherein to generate the reinstated print operation, the reinstating engine is to:
   determine remainder of content and number of pages that did not print owing to the print intervention event; and
   generate the reinstated print operation based on the remainder of content and number of pages.

8. The system as claimed in claim 1, wherein the reinstating engine is to further:
   securely maintain the reinstated print operation as hidden data that is neither accessible nor visible in the specified memory location; and
   on receiving the random-access code, retrieve the reinstated print operation corresponding to random-access code.

9. The system as claimed in claim 8, wherein the reinstated print operation is displayed on a display panel coupled to the system upon receipt of the random-access code.

10. The system of claim 1, wherein the reinstating engine is to map each of a plurality of reinstated print operations within the reinstated print queue with a respective random-access code.

11. A method comprising:
- detecting occurrence of a print intervention event, wherein the print intervention event interrupts an ongoing print operation from completing;
- obtaining a random-access code, wherein the random-access code is based on a print attribute corresponding to the intervened print operation;
- generating a reinstated print operation based on the intervened print operation;
- storing the reinstated print operation in a reinstated print queue in a hidden state and is not accessible nor visible; and
- securely maintaining the reinstated print operation as data that is not visible in a specified memory location, wherein the reinstated print operation is accessible upon providing the random-access code.

12. The method as claimed in claim 11, wherein the obtaining the random-access code comprises:
- obtaining the print attribute of the intervened print operation; and
- generating the random-access code through a random function based on the print attribute.

13. The method as claimed in claim 11, further comprising communicating the random-access code to a user.

14. The method of claim 13, wherein communicating the random-access code to the user includes displaying the random-access code on a display panel.

15. The method of claim 13, wherein communicating the random-access code to the user includes providing the random-access code to the user via email or a messaging service to the user.

16. The method as claimed in claim 11, the method further comprising:
- prompting a user to provide the random-access code;
- on receiving the random-access code, retrieving the reinstated print operation corresponding to the received random-access code; and
- initiating the reinstated print operation on receiving an additional identifier from the user.

17. A non-transitory computer-readable medium comprising instructions executable by a processing resource to:
- determine a print attribute of a print operation, wherein the print operation is interrupted by a print intervention event;
- generate a random-access code based on the print attribute;
- convert the intervened print operation to a reinstated print operation;
- store the reinstated print operation in a reinstated print queue in a hidden state and is not accessible nor visible; and
- securely maintain the reinstated print operation as data that is not visible in a specified memory location, wherein the reinstated print operation is accessible upon providing the random-access code.

18. The computer-readable medium as claimed in claim 17, further comprising instructions to monitor the print operation.

19. The computer-readable medium as claimed in claim 17, further comprising instructions for determining extent to which the interrupted print job was completed prior to occurrence of the print intervention event.

* * * * *